M. D. RATHBUN.
FENDER DEVICE.
APPLICATION FILED FEB. 11, 1921.
1,397,451. Patented Nov. 15, 1921.
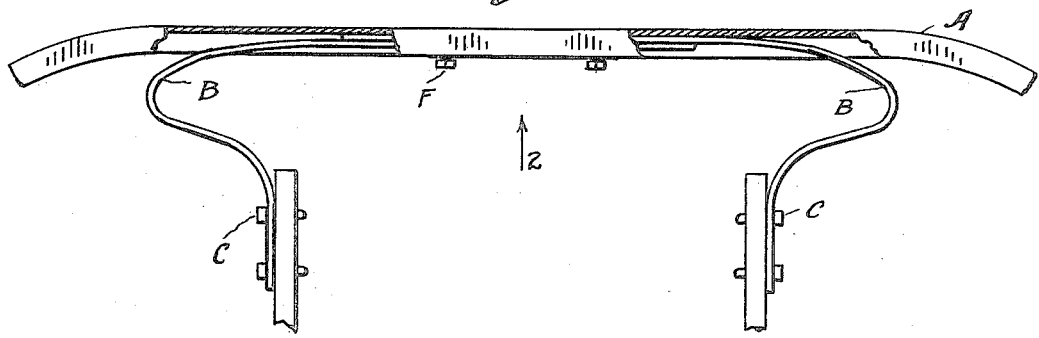
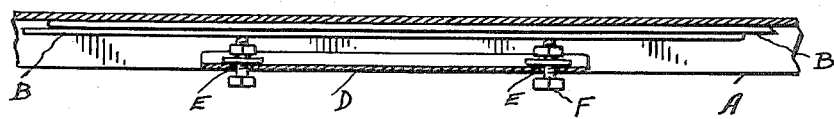
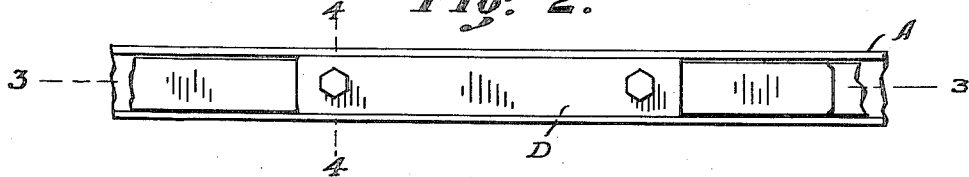
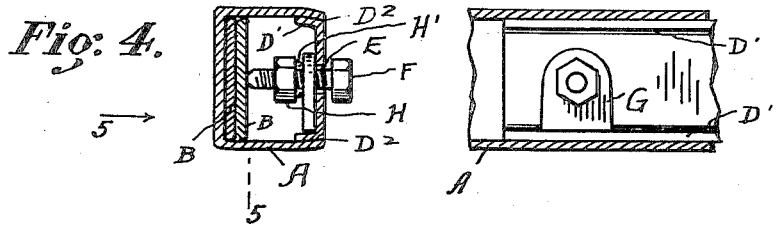
INVENTOR
MILO D. RATHBUN.
BY Thomas L. Ryan
ATTORNEY.

UNITED STATES PATENT OFFICE.

MILO D. RATHBUN, OF MUNCIE, INDIANA, ASSIGNOR TO RATHBUN MANUFACTURING COMPANY, OF MUSKEGON, MICHIGAN, A CORPORATION OF MICHIGAN.

FENDER DEVICE.

1,397,451. Specification of Letters Patent. Patented Nov. 15, 1921.

Application filed February 11, 1921. Serial No. 444,268.

*To all whom it may concern:*

Be it known that I, MILO D. RATHBUN, a citizen of the United States, residing at Muncie, in the county of Delaware and State of Indiana, have invented certain new and useful Improvements in Fender Devices, of which the following is a specification.

This invention relates to improvements in fender devices for automobiles, and has reference to the type of device which comprises a fender bar that is connected centrally of and is carried by a semi-elliptical spring member whose ends are inturned and secured to the frame member of the vehicle.

To make practicable the application of this kind of a fender device, to automobile frames of varying widths, is the purpose of the present invention, specific objects being to provide a construction combination and arrangement of spring members and securing means whereby the distance apart of the spring members may be varied, and whereby they may be effectively and easily secured together, and to the fender bar.

My invention is described in the following specification, defined in the appended claims, and is illustrated in the accompanying drawings. The several parts of the device are identified by suitable characters of reference applied thereto in the different views, in which—

Figure 1 is a top plan view of a fender device in which my invention is embodied, portions of the top flange of the fender bar being broken away.

Fig. 2 is an enlarged side view, as seen in the direction indicated by the arrow 2 in Fig. 1.

Fig. 3 is a horizontal sectional view taken on the line 3—3 in Fig. 2.

Fig. 4 is an enlarged cross sectional view taken on the line 4—4 in Fig. 2.

Fig. 5 is a vertical sectional view taken on the line 5—5 in Fig. 4.

The horizontal fender bar A is channel shaped in cross section having the suitable length, and at its ends being slightly curved as shown.

The resilient member upon which the fender bar is supported is made of bar steel of suitable area in cross section to afford the proper strength and resiliency. This resilient member is of divided form; each of the sections B and B has its inturned end bent to form and in direction so that it may be secured by the usual suitable bolts C and C to the vehicle frame members. The complemental, alined end portions of the sections B and B of the resilient member, lie in co-engaged position, one against the other, and occupy the inside of the fender bar, as plainly shown in Figs. 3 and 4.

Located centrally, and at the rear side and between the edges of the flanges of the channel shaped fender bar A, is a back plate D. This plate D has the upper and lower inturned flanges $D^1$ having beveled faces $D^2$. The flanges of the fender bar are bent slightly toward each other and to such angle as to register with the beveled faces $D^2$ of the back plate, as plainly shown in Fig. 4. The back plate D is secured at its position by being spot welded at the beveled faces $D^2$. It is apparent that bolts could be used to secure the back plate at position; this kind of a connection however being undesirable, the combination and arrangement of parts as above described is developed so that while having every advantage as to strength and utility and as an economically constructed connection between the fender bar and the spring member, it permits of the unobstructed external surfaces of the fender bar, and obviates all necessity of cutting away any of the sectional area of the fender bar or of the spring bars. At spaced distance apart, are provided holes E and E through which set screws F and F are passed, and which set screws occupy threaded holes in check plates G and G. These check plates are of the form as shown in Fig. 5 their base portions being of form and of dimension to register with the inner side of the flange of the back plate. H designates a lock nut which is threaded on the set screw and is adapted to be operated by a wrench. A spring-washer $H^1$ performs the usual function.

The simplicity of construction, and of the use of my invention will be apparent. The parts being assembled, and the spring bars B and B being disposed centrally of the fender bar, a wrench is applied to the set screws F and F which are tightened securely, the spring bars B and B being thus locked in engagement with the fender bar, as shown in Fig. 4. It will be seen that by the construction, combination and arrangement of parts a bumper or fender device of rugged strength is provided, and at the same time the device has such combined stiffness and resiliency, that while fully resistive of shocks, the impact of shock is uniformly absorbed and distributed so as to give the maximum of effect desired of this kind of device. By reason of the central connections for the fender bar, at the central portion of resilient member of the curvilinear form shown, it is apparent that although the stiff fender bar with its rigid strength of resistance performs the usual function, it is so yieldable at the extreme end portions that damage otherwise accruing from external objects is avoided; at the same time the impact at the end of the fender bar is absorbed uniformly through the entire portion of the spring member; thus there is the minimum of chance for the force of even the greater shocks, to strain any of the parts of the device beyond the limit of elasticity. A fender or bumper device of construction in accordance with my invention is therefore of long life and of full effect as long as it is in use.

What I claim as my invention, and desire to secure by Letters Patent, is—

1. In a fender device, the combination of a spring member to be connected to the vehicle frame, the spring member being of divided form, the ends thereof being in alinement one upon the other, a fender bar carried by the spring member, and a clevis connection between the fender bar and the ends of the spring member to clamp the parts together, substantially as described.

2. In a fender device, the combination of a spring member to be connected to the vehicle frame the spring member being of divided form the ends thereof being in alinement one upon the other, a fender bar carried by the spring and being channel shaped in cross section, a back plate between the edges of the fender bar, check plates inside the back plate, set screws passed through holes in the back plate, and threaded through the check plates and to be tightened against the spring bar, substantially as shown.

3. In a fender device, the combination of a resilient member semi-elliptically formed spring, of a fender bar secured at its central portion, the ends of the fender bar extending beyond the ends of the spring member so that shock imparted to the fender bar near its ends is absorbed substantially the same as if imparted directly to the spring member.

In testimony whereof I affix my signature.

MILO D. RATHBUN.